United States Patent

Burroughs et al.

[15] 3,667,608
[45] June 6, 1972

[54] APPARATUS FOR REMOVING OIL SPILLS FROM THE SURFACE OF A BODY OF WATER

[72] Inventors: Ralph H. Burroughs, Chapel Hill; Paul R. Cox, Jr., Cary, both of N.C.

[73] Assignee: Hercules Incorporated, Wilmington, Del.

[22] Filed: Apr. 24, 1970

[21] Appl. No.: 31,472

[52] U.S. Cl. .......................................210/242, 210/DIG. 21
[51] Int. Cl. .........................................................E02b 15/04
[58] Field of Search ...................210/23, 170, 172, 242, 279, 210/289, 457, 460, 496, 510, DIG. 21

[56] References Cited

UNITED STATES PATENTS

| | | | |
|---|---|---|---|
| 3,096,204 | 7/1963 | Spangler et al. | 210/23 X |
| 3,263,811 | 8/1966 | Baker et al. | 210/460 X |
| 2,788,125 | 4/1957 | Webb | 210/172 |
| 2,711,828 | 6/1955 | Webb et al. | 210/172 X |
| 3,246,766 | 4/1966 | Pall | 210/457 |
| 3,093,583 | 6/1963 | Stoll | 210/496 X |

Primary Examiner—Samih N. Zaharna
Attorney—Edwin H. Dafter, Jr.

[57] ABSTRACT

Oil is removed from contaminated water by means of a fibrous structure of low denier polyolefin fibers attached to a pumping system. The polyolefin fiber structure can absorb many times its own weight of oil while absorbing little or no water. The oil is then easily removed from the fibrous structure by pumping.

4 Claims, 6 Drawing Figures

PATENTED JUN 6 1972 3,667,608

RALPH H. BURROUGHS
PAUL R. COX, JR.
*INVENTORS*

BY Edwin H. Defty
ATTORNEY

RALPH H. BURROUGHS
PAUL R. COX, JR.
INVENTORS

BY

ATTORNEY

APPARATUS FOR REMOVING OIL SPILLS FROM THE SURFACE OF A BODY OF WATER

This invention relates to a novel apparatus for removing a liquid hydrocarbon from the surface of a body of water. In particular it relates to the clean-up of oil and gasoline contamination from the surfaces of rivers, lakes, bays, and oceans.

In recent years, considerable public indignation has been aroused and considerable harm has been done to wild life and the environment in coastal waters of the world by accidental oil and gasoline spills. These spills result not only from ships on the high seas, but from the so-called off-shore drilling operations as well.

When a substantial volume of oil or gasoline is spilled, there is no truly satisfactory method known as yet for effecting its removal. In many cases, it is just left, depending on the ocean to disperse and dilute it sufficiently that it will not be harmful to marine life with which is comes into contact. When such a spill threatens to reach the shore in large quantities, it is frequently treated with a surfactant to emulsify the entire "slick" which causes it to sink to the bottom or aids in dispersing it into the water.

The methods mentioned above are unsatisfactory, if only because they leave the contaminant in the water, where a considerable period of time is required for it to be decomposed, consumed, or otherwise disposed of by natural forces. During this time a great deal of damage can be done to the flora and fauna present in the contaminated area.

In another approach to the problem, mechanical means are employed which remove the oil from the water and recover it. One such device comprises a mat of an oleophilic fibrous material which skims the surface of the water picking up the oil and is then passed through a pair of squeeze rolls to remove the oil for collection. A variation of this device employs a polyurethane foam belt which acts as a sponge picking up the oil which is then squeezed out for collection. In yet another approach, a highly oleophilic material such as polyolefin flake is sprinkled on the spill to absorb the oil, following which it is removed from the water by vacuum, or other means, and destroyed.

It is an object of this invention to provide an improved apparatus for removing oil, gasoline, crude petroleum, and similar hydrocarbon contaminants (hereinafter referred to collectively as "oil") from the surface of a body of water, which enables the contaminant to be economically recovered, in some cases in a substantially water-free condition.

The invention takes advantage of the affinity of fibers of olefin polymers for hydrocarbon liquids. A mass of these fibers when in contact with a hydrocarbon liquid exhibits a pronounced "wicking" action whereby it can pick up many times its weight of oil and when the mass is thus wet with oil, it is substantially impervious to water.

The method of using the device of the invention whereby this property of the fibers is utilized comprises:
a. contacting the surface of the body of water with a coherent fibrous polyolefin structure in the area of said oil,
b. applying a pumping force to said fibrous structure at at least one point along its length whereby oil is removed from the fibrous structure; and
c. recovering the oil.

Several embodiments of the invention are known as depicted in the attached drawings in which.

As stated above, the invention utilizes the selective wicking ability of the polyolefin fiber for oil. In addition to adsorption of oil by the fiber itself, there is a capillary action whereby oil is drawn into the body of the fibrous structure between fibers and held there. The oil thus picked up by the fibrous structure is readily removed by pumping or by applying a vacuum thereto. The pumping force mentioned hereinabove is intended to include vacuum.

Figure 1:
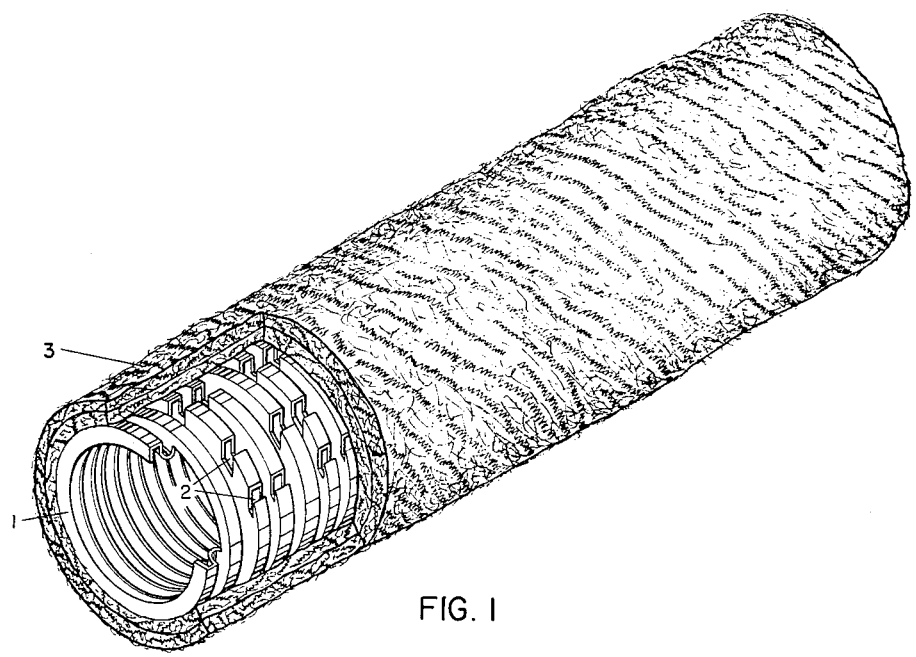
FIG. 1 illustrates one form of fibrous polyolefin structure which can be employed in the process.

The fibrous structure can be in either of several forms as depicted in the drawing. In the embodiment depicted in FIG. 1, a plastic pipe 1, having a plurality of perforations 2 on its surface is wrapped with a thickness of a fibrous polyolefin 3.

Figure 2:
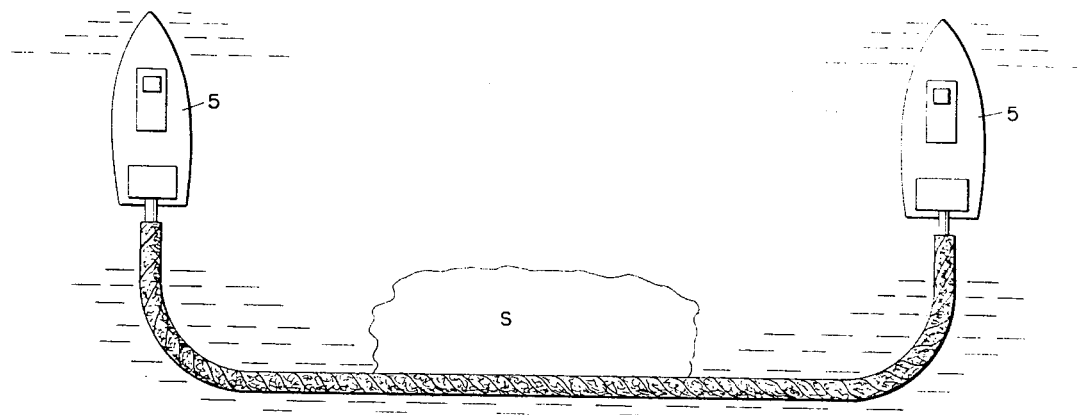
FIG. 2 illustrates the manner in which the apparatus of FIG. 1 is employed.

The implementation of the process using the device of the invention according to this embodiment can conveniently be carried out as shown in FIG. 2 by suspending the desired length of the fiber-wrapped perforated pipe 4 between two boats or barges 5 which ply back and forth, sweeping the surface of the area contaminated by the oil slick designated by S in the drawing. One or both of the barges is equipped with a pumping system capable of drawing the oil through the pipe and into storage facilities provided on the boat or barge.

It is found that when the filament-wrapped perforated pipe is placed on the surface of the body of water containing an oil slick, the fibers absorb oil to the limit of their capacity rather quickly. The wicked oil is then pushed through the perforations into the pipe by differential pressure. From the pipe, the oil is readily removed by pumping.

Figure 3:
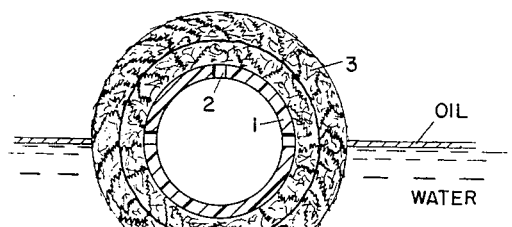
FIG. 3 illustrates this form of apparatus in its optimum operating position in the water.

Using this embodiment of the invention it is possible to recover practically water-free oil if the perforations in the pipe are at or above the oil-water interface, as shown in FIG. 3. If there are holes below the surface of the water, a substantially water-free product can be recovered by pumping at a rate approximately equal to the rate at which oil is picked up by the fibrous covering. An oil-water mixture can be easily separated, however, after it is collected, so the collection of some water is not a serious drawback.

The perforated pipe employed in this embodiment of the invention is preferably of a plastic material having a specific gravity less than that of water. Plastic materials, such as polyethylene and polypropylene, having specific gravities of about 0.9 to about 0.96, are ideally suited and are preferred. Other plastic materials can also be used. Moreover, materials having higher specific gravities can be employed so long as provision is made to assure that the covered pipe remains on the surface of the water. For example, various types of water-impervious floating materials can be attached to a pipe made from a non-floating material such as rubber to assure that it does not sink.

The diameter of the pipe is determined according to conventional engineering practices based on the length of the pipe, the area of the perforations, and the capacity of the pumps employed to remove the oil from the pipe. Depending on such factors, the diameter can range from less than an inch up to several inches.

For most efficient use it is also preferred that the perforated pipe be flexible. A flexible pipe is particularly advantageous when operating in rough water as is frequently the case when cleaning spills on the ocean. Flexibility permits the pipe to ride with the waves and remain on the surface of the water more readily than would a rigid pipe. Although not necessary, a corrugated pipe is preferred as the corrugations increase the flexibility of some materials which would otherwise not be sufficiently flexible to function efficiently. Moreover, the corrugated pipe is better able to resist collapse under the influence of the pumping force employed to remove the oil than is a flexible, non-corrugated pipe.

The perforated pipe is wrapped with one or several layers of polyolefin fiber which substantially completely cover the surface of the pipe. The polyolefin fiber can be made of polyethylene, polypropylene, or any of the polyolefins known to the textile art for use as filaments. The most commonly used and preferred polyolefins are those based on propylene, referred to generically as polypropylene.

The polyolefin fiber can be employed in any form which is capable of forming a complete covering on the perforated pipe. Thus, it can be in the form of a continuous filament tow or yarn, a yarn spun from staple fiber, or a woven or nonwoven fabric. The individual fibers can be of any size up to about 70 denier per filament, preferably about 10 denier per filament or less including microfibers of less than 1 denier per filament. The fibers can be crimped or smooth, although crimped fibers are preferred for their greater structural coherency.

The fibrous covering is applied to a thickness sufficient to assure substantially complete coverage of the pipe, with no discontinuity in the covering. Except for this limitation, the fibrous layer can be as thick or as thin as needed depending upon the size of the oil slick, the diameter of the perforated pipe and the capacity of the pumps.

In a preferred embodiment of fiber will be in the form of a crimped polypropylene tow or staple sliver composed of a great number of relatively low denier individual continuous filaments. These individual filaments can be of any size up to about 70 denier per filament and preferably 10 denier per filament or less. For convenience and economy in wrapping, it is preferred to use a tow or staple sliver of or greater than 100,000 to minimize the number of wraps required to build up a thickness of the tow on the pipe sufficient to substantially completely cover the surface of the pipe.

Polyolefin tow can be conveniently wrapped on the pipe directly after its formation and crimping in a conventional textile process. The pipe can serve as a collecting mandrel in lieu of feeding the tow to a staple cutter as is normally done. One or several layers of the tow can be wound depending upon the thickness of fiber layer desired and the total denier of the tow. It is prudent to effect the winding in several layers to assure that there are no discontinuities in the filamentary covering. If such discontinuities are present, water can pass through and be collected with the oil.

Figure 4:
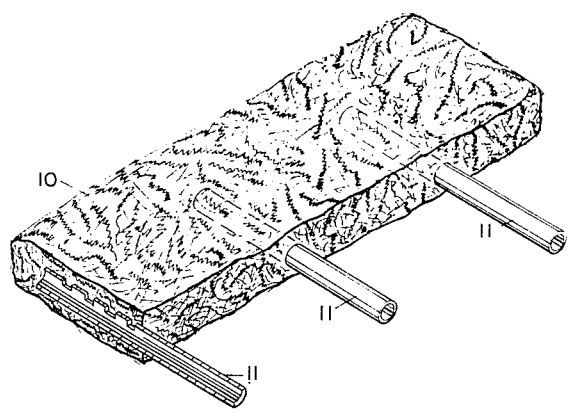
FIG. 4 illustrates another form of the fibrous polyolefin structure which can be employed.
Figure 5:
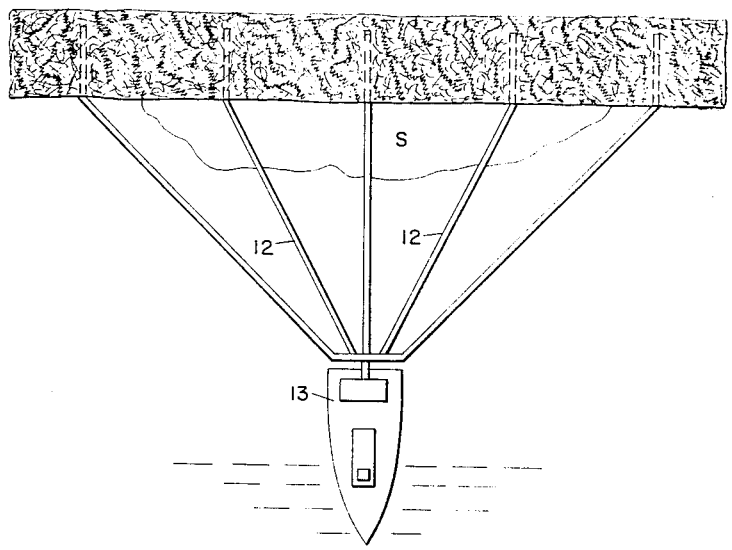
FIG. 5 illustrates a manner of employing the apparatus of FIG. 3.

In the alternative embodiment of the invention depicted in FIG. 4 and 5 fibrous polyolefin structure comprises an elongated, coherent batt or mat 10 having a plurality of fittings 11 embedded therein to serve as pumping points. The fittings 11 are connected to appropriate pumping lines 12 which in turn are connected to a pump or to a vacuum source on barge of boat 13. The polyolefin batt is dragged through the slick to pick up oil which in turn is pumped into appropriate storage facilities on boat 13.

Figure 6:
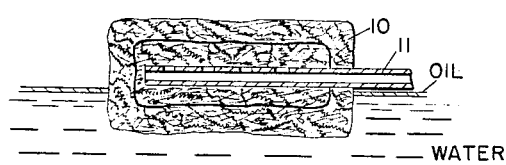
FIG. 6 illustrates the apparatus of FIG. 3 in its optimum operating position in the water.

As shown in FIG. 6, the fibrous batt 10 when in use, rests in the oil slick and on top of the water. The fittings 11 are located approximately at the oil-water interface. When oil is absorbed on the batt, and pumping force applied, oil is drawn into the fittings and removed from the batt. The preferred pumping force for use with this embodiment of the invention is vacuum. Capillary action causes the oil in the areas between the fittings to flow to the fittings for removal. The removed oil is immediately replaced by new oil picked up from the water surface by the previously described wicking action.

Using this embodiment of the invention, substantially 100 percent oil is recovered so long as the pumping fittings are located above the level of the water and so long as the batt is wet with oil. The presence of oil on the fibers substantially completely blocks passage of water into the batt.

The fibrous polyolefin employed in this embodiment can be in any conventional textile form. A nonwoven web of continuous filament, staple tow, cut staple fiber, or microfiber is preferred. The individual fibers in the batt are preferably 70 denier or less and more preferably less than 10 denier. It is found that the volume of oil picked up by the fibrous polyolefin is inversely related to the denier of the fiber, i.e., the smaller the fiber denier, the greater the absorption capacity of the batt. A 3 to 70 denier fiber structure is able to pick up as much as 1,800 percent of its own weight of oil. Fibers of less than one denier have been found to pick up as much as 4,000 percent of their weight. The web can be bonded in any conventional manner such as by means of a water or hydrocarbon insoluble adhesive or preferably by mechanical means such as needle punching. Alternatively, an unbonded web of fibers enclosed with a porous covering such as gauze or fine wire screen can be employed.

Prior to employing any form of the fibrous structure in the process it is desirably impregnated with liquid hydrocarbon. This impregnation can be accomplished by treating the structure as by dipping, spraying, or the like treatment, or by employing an appropriate oil, such as mineral oil, as a fiber processing finish during the preparation of the fibers. The latter method is convenient inasmuch as a finish of some sort is customarily employed to facilitate the usual textile processing operations.

An affirmative act of impregnation is usually only desirable in the first use of the fibrous structure in the process. Having once been used, the fibers will retain a sufficient quantity of the oil that they will remain impregnated for future usage. It is obvious, however, that such preliminary impregnation is not mandatory because the fibers will automatically become so impregnated in the early stages of use. In fact, if water gets into the fibrous structure in the early stages of use, it is quickly displaced by oil.

In addition to the method of carrying out the process described above, there are several attractive alternative ways of using the invention. For example, apparatus of the types described can be installed as a permanent protective barrier for a beach. One or several of the fibrous structures can be strung out and permanently anchored in the ocean off-shore from the beach and connected to a pumping and storage apparatus located on shore. When contamination of the beach appears imminent the pumps can be started as soon as the oil reaches the fibrous structure and the contaminant removed from the water before it can reach the beach.

In another alternative embodiment of the invention, an off-shore drilling rig can be encircled with one or several rings of the fibrous structures connected with appropriate pumps. In the event of a spill or of a break in the well causing leakage from the well, the pumps can be started as soon as the oil reaches the fibrous structure and the free oil removed from the surface as it spreads out from the area of the break to the protective ring. The oil collected in this operation can be pumped directly into the storage vessels originally provided for the drilling rig. In this way the spill can be confined within a relatively small area and can readily be removed with a minimum of harm to the surrounding environment.

The invention is illustrated by the following examples.

EXAMPLE 1

A 3-inch corrugated polyethylene pipe was perforated with an average of about two, ¼ × ¼ inch holes per square inch randomly dispersed on the peaks of the corrugations. A length of this pips several feet long was loosely wrapped with about 0.9 inch of a crimped, 3 dpf, 400,000 total denier polypropylene tow sized with mineral oil.

An oil slick approximately one-fourth inch thick was created by pouring kerosene on the surface of a body of water contained in a large, wide-mouth vessel. The tow-wrapped perforated pipe was floated in this vessel and one end was attached to a gear pump adapted to discharge into a barrel. The other end of the pipe was sealed.

With the pump operating, the surface of the water was swept with the pipe. In several passes of the pipe over the surface of the water, substantially all of the oil was removed. The recovered oil contained only a trace of free water.

EXAMPLE 2

An oil slick about one-half inch thick was created by pouring kerosene on the surface of a body of water in a large, wide mouth vessel. A batt of polypropylene microfiber (0.03 dpf), about 2 feet by 2 inches by 6 inches and with four ¼-inch metal fittings embedded therein along the long dimension to a depth of 4 inches was floated on the oil. The metal fittings were perforated throughout the area embedded in the fibrous batt and were attached by means of appropriate hoses to a vessel which in turn was attached to a vacuum pump so that the vessel served as a trap to collect the oil.

Within a few minutes after contacting the oil slick, the fibrous batt appeared saturated with oil. The vacuum pump was turned on to pull a vacuum through the metal fittings embedded in the polypropylene batt whereby oil was removed from the batt and collected in the trap. The oil was substantially free of water. When all of the oil has been removed, the pump drew air into the vessel, but still only a very small quantity of water was present in the oil.

What we claim and desire to protect by Letters Patent is:

1. Apparatus for removing oil from the surface of a body of water comprising an elongated, coherent fibrous polyolefin structure having a plurality of pumping fittings embedded therein at intervals along the length thereof.

2. The apparatus of claim 1 in which the coherent fibrous polyolefin structure is prepared from polypropylene fibers.

3. The apparatus of claim 2 in which the polypropylene fibers are crimped fibers.

4. The apparatus of claim 1 in which the pumping fittings are prepared from a synthetic plastic having a specific gravity less than water.

* * * * *